United States Patent [19]
George

[11] Patent Number: 5,891,583
[45] Date of Patent: Apr. 6, 1999

[54] METHOD OF PROTECTING WOODEN OBJECTS FROM DECAY

[75] Inventor: Richard Warrington George, Castlemorton, England

[73] Assignee: Fenson & Company Limited, Worcestershire, United Kingdom

[21] Appl. No.: 875,776

[22] PCT Filed: Jan. 12, 1996

[86] PCT No.: PCT/GB96/00049

§ 371 Date: Aug. 5, 1997

§ 102(e) Date: Aug. 5, 1997

[87] PCT Pub. No.: WO96/25277

PCT Pub. Date: Aug. 22, 1996

[30] Foreign Application Priority Data

Feb. 17, 1995 [GB] United Kingdom .................. 9503122
Sep. 11, 1995 [GB] United Kingdom .................. 9518494

[51] Int. Cl.⁶ .............................. B32B 11/00; B05D 3/02
[52] U.S. Cl. ...................... 428/490; 428/537.1; 428/489; 427/393; 427/397; 427/441; 156/337
[58] Field of Search ..................... 427/393, 397, 427/408, 440, 441; 156/337; 428/489, 490, 537.1

[56] References Cited

U.S. PATENT DOCUMENTS

| | | |
|---|---|---|
| 893,391 | 7/1908 | Sinclair .................................. 427/397 |
| 2,109,508 | 3/1938 | Schmittutz . |
| 2,875,020 | 2/1959 | Ring .............................................. 21/7 |
| 3,448,585 | 6/1969 | Vogelsang . |
| 3,467,490 | 9/1969 | Sommer . |
| 3,638,790 | 2/1972 | Schmid et al. .......................... 206/65 S |
| 4,708,527 | 11/1987 | Inhofe, Jr. et al. ...................... 405/216 |
| 4,779,735 | 10/1988 | Kelso, Jr. ................................. 206/484 |
| 4,908,085 | 3/1990 | Makus et al. ........................... 156/215 |
| 5,138,806 | 8/1992 | Marx et al. ............................... 52/170 |

FOREIGN PATENT DOCUMENTS

| | | |
|---|---|---|
| 1 211 787 | 3/1966 | Germany . |
| 937744 | 9/1963 | United Kingdom . |

*Primary Examiner*—Shrive Beck
*Assistant Examiner*—Michael Barr
*Attorney, Agent, or Firm*—Young & Thompson

[57] ABSTRACT

A method in which a flexible outer barrier layer is applied to at least that part of the object most vulnerable to decay, a bituminous substance is provided between the outer barrier layer and the object, and the barrier layer is heated so as to melt the bituminous substance sufficiently for it to bond intimately to the wooden object. The barrier layer may be a heat shrinkable plastic film and may be a sleeve which is heat shrunk onto the object. The invention is particularly useful for protecting vulnerable parts of elongate wooden objects, such as fence posts or poles, from decay.

7 Claims, No Drawings

METHOD OF PROTECTING WOODEN OBJECTS FROM DECAY

BACKGROUND OF THE INVENTION

This invention relates to a method of protecting wooden objects, particularly elongate ground contact objects such as fence posts and telephone and electricity poles, from decay.

Preservative treated fence posts despite advances in preservative technology are still prone to ground level decay. Typically, after 20 years service, 5%–30% of posts will be showing signs of decay at or below ground level, although this is to some extent dependent on ground conditions and standards of preservative treatment.

This is unfortunate as the other parts of the posts, i.e. those deep below ground and those well above ground, would give a typical life of 40–50 years or more.

The top portion of a fence post, i.e. that from approximately 50–75 mm above ground level, is exposed to natural air flow and sunlight which will ensure a typical moisture content of 15%–70%, dependent on weather conditions. These factors combined with preservative treatment should mean that decay is very rare.

The bottom portion of the post, i.e. that from approximately 300 mm below ground level, does not decay because of the very high moisture content (typically 30%–90%) and the compacted wet soil conditions will ensure minimum levels of oxygen which is vital for the growth of rotting organisms.

This leaves the middle portion from about 300 mm below ground level to about 75 mm above ground level where conditions are ideal for decay.

The fence post acts as a wick drawing up water and solids to a band at ground level where the water evaporates. This portion of the post is very damp, typically 30%–90% moisture content, and is exposed to ground and airborne microorganisms which come into contact with the post and form primary moulds which are then followed by soft rots and Basidiomycetes.

Although preservatives greatly extend the life of fence posts (untreated posts typically last only 3–4 years), it is difficult to measure the standard of preservative treatment. Consequently, poor treatment can pass unnoticed.

Preservative belts, sleeves and wraps are also known. These relatively expensive products are predominantly used for the treatment of posts and poles in service, where their main purpose is to provide preservative material to replace that which may have been lost due to, inter alia, leaching. The sleeve wrap or belt provides additional preservative material at the outer face of the pole or post which is then absorbed, the objective being to totally penetrate the pole or post with preservative, hence eliminating decay.

SUMMARY OF THE INVENTION

According to the present invention there is provided a method of protecting wooden objects from decay, the method comprising the step of applying a flexible outer barrier layer to at least that part of the object most vulnerable to decay, providing a bituminous substance between the barrier layer and the object and heating the barrier layer so as to melt the bituminous substance sufficiently for it to bond intimately to the wooden object.

DESCRIPTION OF THE PREFERRED EMBODIMENTS

For the avoidance of doubt, the term "bituminous substance" used herein includes, for example, bitumen, tar, pitch, coal tar, asphalt, gilsonite, or any combination thereof in straight or modified form.

Preferably, the outer barrier layer is in the form of a plastics film or a metal foil or a combination thereof. Where a plastics film is used, it may be made from recycled plastics material.

Preferably, the barrier layer is coated with said bituminous substance prior to application to the object.

Preferably, where the barrier layer is in the form of a plastics film, it is applied to the object at an elevated temperature.

In this latter case, the plastics film is, preferably, of heat shrinkable plastics material and is formed into, or is in the form of, a sleeve which is heat shrunk onto the object.

Alternatively, the plastics film may be in the form of an elongate strip which is wound about the object while applying heat and tension to the strip, or may be in the form of a sheet which is wrapped around the object whilst applying heat and pressure.

Typically, the bituminous substance may include wood preservatives and/or adhesion promoters.

In the case of fence posts and ground engageable poles, it is only necessary to surround a part of the post with the barrier layer and the bituminous substance. This may be a portion of the post intermediate it ends or it may be the entire lower portion of the post. It is not necessary to surround that portion of the post which will, in use, be disposed well above ground level.

The invention also resides in an object, such as a wooden fence post or ground engageable pole, protected by the aforesaid method.

In one example, a heat shrinkable thermoplastics sheet (typically low or medium density U.V. stabilised polyethylene or polyvinylchloride) is hot coated on one face with a molten bituminous substance comprising one or more of the group comprising bitumen, tar, pitch, coal tar, asphalt or gilsonite, in straight or modified form. The bituminous substance should be sufficiently fluid to bond to the wooden object at a temperature lower than the temperature at which the thermoplastics sheet is heat shrinkable. Bitumen has been found to be particularly suitable and typically the thickness of the bitumen solution is about 1 mm. The bituminous substance may include wood preservatives and/or adhesion promoters. It may also include fillers, extenders, plasticisers and/or elastomers. It may also include reinforcing fibres. However, the total of any wood preservative, adhesion promotors, fillers, extenders, plasticisers and elastomers preferably should not exceed 20% by weight. Indeed, if any wood preservative is to be used it may well be desirable to overcoat the bituminous substance with it.

The sheet of thermoplastics material is preferably of sufficient thickness to be resistant to grass trimmers and animal attack and, typically, has a thickness of 100–600 microns, but can be thicker. It may be necessary to cool the other face of the sheet during hot coating with the bituminous substance to prevent the sheet reaching a temperature at which shrinking will occur. Also, it may be desirable to pretreat the sheet using corona discharge or a flame to improve adhesion of the bituminous substance to the film.

It has been found that a blend of 50% by weight of 50 PEN grade bitumen +50% by weight of 85/40 oxidized grade bitumen (BS3690 Part 2 1994) will operate satisfactorily over a temperature range of 0 to 30° C. without cracking at low temperatures and without sticking to itself or adjacent sleeves at higher temperatures. For a larger temperature range it may be necessary to use a very sticky layer of 200–800 PEN grade bitumen adjacent to the thermoplastics sheet with a second less sticky top layer of 25–50 PEN grade bitumen. Also, in either case, it may be desirable to dust over the exposed surface of the bitumen to ensure it does not stick to an adjacent thermoplastics sheet during storage and transportation.

It has subsequently been found that an 85/40 oxidized grade bitumen with added temperature dependent viscosity modifier allows the characteristics of the bitumen to be maintained to 40° C. whilst giving a rapid reduction in viscosity above this temperature thereby ensuring excellent bond to the pole or post. A grade of bitumen with a straight viscosity modifier has also proved effective.

The film is then formed into a sleeve (such as by welding) which is of large enough diameter (or equivalent dimension) to fit over a fence post or pole, but not so large that it cannot be heat shrunk tightly onto the post or pole. However, an extruded sleeve can be subsequently coated with bitumen.

In forming the film into a sleeve, the film is preferably orientated such that the main direction of shrinkage extends circumferentially around the sleeve.

The sleeve is placed over the fence post (which may or may not be previously treated with conventional preservative) and positioned so that, when heat shrunk, it will encapsulate the required area of the post or pole.

The sleeve is then heated (typically using hot air or infra red heating or possibly even a blow torch) at a temperature of between 80°–250° C. This temperature will be sufficient to ensure that the bituminous substance has melted to a sufficiently liquid state to intimately bond to the post prior to shrinkage of the sleeve. Thus, when the sleeve shrinks, an airtight sleeve is formed around the post. The sleeve is advantageously heated from one end in order to ensure that all air is expelled. However, the sleeve could be perforated to allow air to escape, the perforations being sealed by the bitumen.

The sleeve, together with the bituminous substance, will prevent oxygen, micro-organisms, nitrogen and termites from the surrounding soil and air entering that portion of the post which has been encapsulated and will also greatly reduce the leaching of preservatives from the posts into the surrounding soil.

Also, the presence of the sleeve below ground effectively moves the entry point for moisture by the length of the sleeve below ground level. Thus, in the encapsulated area the moisture content is considerably lower than a non-encapsulated area. Depending on sleeve length and ground conditions, it is possible to reduce the moisture content below the 20% level needed for decay to occur within the encapsulated portion. The overall effect of the sleeve is to dramatically reduce the likelihood of decay and resultant premature post or pole failure.

The film may be stored and transported in the form of a coated sleeve or in the form of a coated sheet which could be rolled up for ease of storage and transportation and which is cut to size and formed into a sleeve by overlapping the edges and stapling it to the post or pole when it is to be used. It is then heat shrunk as described previously.

A strap could be tied around the top and bottom of the sleeve where the sleeve is most vulnerable and/or the top and bottom of the sleeve could be folded into the remainder of the sleeve prior to heat shrinking. This will result in a higher clamping force at the top and bottom of the sleeve when the sleeve is heat shrunk.

Electricity and telephone poles are generally treated with creosote. Non-cross linked polyethylene can be unsuitable as it can be attacked by creosote. This can be overcome by using cross-linked polyethylene for the barrier layer, but this is expensive. As an alternative, it would be possible to use an intermediate layer, typically of aluminium foil, between the polyethylene and the bitumen. The foil and polyethylene could be fused together by heat.

Indeed, it may be possible to replace the thermoplastics sheet with a metal foil or sheet and to use this as the barrier layer. However, in this case it will not be possible to heat shrink the barrier layer onto the post or pole, although heat may still be applied to soften the bitumen on application to the pole or post.

The above method of encapsulation can also be used to protect other wooden objects in other applications.

In another example, the plastic sheet material is in the form of an elongate strip which is hot coated on one face with a molten bituminous substance and which is then wound about the object in helical manner, while applying heat and tension to the strip.

In yet another example, the plastics film is in the form of a sheet which is hot coated on one face with a bituminous substance and which is then wrapped around the object while applying heat and pressure.

In these latter two examples, the plastics material can be of either heat shrinkable material or non heat shrinkable material.

Some preservative materials can be temperature sensitive and their effectiveness can be reduced by applying a heat shrinkable sleeve. To overcome this, a non-heat shrinkable sleeve can be made with a low melting point bituminous substance allowing the sleeve to be applied at lower temperatures without neutralising the preservative.

I claim:

1. A method of protecting a wooden object from decay, the method comprising the steps of firstly forming a heat shrinkable plastic sleeve and coating an inner surface of the sleeve with a bituminous substance prior to application of the sleeve to the object, and subsequently applying the coated sleeve to the part of the object to be protected and heating the sleeve so as to heat shrink the sleeve onto the object and so as to melt the bituminous substance sufficiently for it to bond to the wooden object.

2. A method as claimed in claim 1, wherein the bituminous substance includes one or more from the group consisting of bitumen, tar, pitch, coal tar, asphalt, and gilsonite.

3. A method as claimed in claim 1, wherein the bituminous substance also includes one or more additives from the group consisting of extenders, fillers, plasticisers, elastomers, wood preservatives and adhesion promoters.

4. The method of claim 1, where the sleeve is heated to a temperature between 80°–250° C.

5. A method as claimed in claim 1, wherein the object is a wooden fence post.

6. A method as claimed in claim 1, wherein the object is a wooden pole.

7. An object protected by the method claimed in claim 1.

* * * * *